United States Patent
Budde et al.

(10) Patent No.: US 7,844,459 B2
(45) Date of Patent: Nov. 30, 2010

(54) METHOD FOR CREATING A SPEECH DATABASE FOR A TARGET VOCABULARY IN ORDER TO TRAIN A SPEECH RECOGNITION SYSTEM

(75) Inventors: Mark Budde, Bottrop (DE); Tobias Schneider, Munich (DE)

(73) Assignee: Siemens Aktiengesellschaft, Munich (DE)

(*) Notice: Subject to any disclaimer, the term of this patent is extended or adjusted under 35 U.S.C. 154(b) by 2006 days.

(21) Appl. No.: 10/276,071

(22) PCT Filed: Apr. 24, 2001

(86) PCT No.: PCT/DE01/01546

§ 371 (c)(1),
(2), (4) Date: Nov. 12, 2002

(87) PCT Pub. No.: WO01/86634

PCT Pub. Date: Nov. 15, 2001

(65) Prior Publication Data

US 2003/0120490 A1  Jun. 26, 2003

(30) Foreign Application Priority Data

May 9, 2000  (DE) ................. 100 22 586

(51) Int. Cl.
*G10L 15/04* (2006.01)
(52) U.S. Cl. .............. 704/254; 704/255; 704/243; 704/231; 704/251; 704/235
(58) Field of Classification Search .......... 704/254, 704/255, 231–245, 251
See application file for complete search history.

(56) References Cited

U.S. PATENT DOCUMENTS

| 5,579,436 | A  |   | 11/1996 | Chou et al. |
| 5,850,627 | A  | * | 12/1998 | Gould et al. ............... 704/231 |
| 6,108,627 | A  | * | 8/2000  | Sabourin .................. 704/243 |
| 6,134,528 | A  | * | 10/2000 | Miller et al. .............. 704/258 |
| 6,195,634 | B1 | * | 2/2001  | Dudemaine et al. ......... 704/231 |
| 6,260,014 | B1 | * | 7/2001  | Bahl et al. ................ 704/254 |

FOREIGN PATENT DOCUMENTS

| DE | 4110300 A1  | 10/1992 |
| DE | 4222916 A1  | 6/1993  |
| DE | 68914032 T2 | 7/1994  |
| DE | 69030301 T2 | 10/1997 |
| EP | 0344017 B1  | 11/1989 |
| EP | 0435336 A2  | 7/1991  |

OTHER PUBLICATIONS

Hunt et al., "Unit Selection in a Concatenative Speech Synthesis System Using a Large Speech Database", IEEE 1996, pp. 373-376.
Benítez et al., "Different Confidence Measures for Word Verification in Speech Recognition", Speech Communication 32 (2000) 79 94, pp. 79-94.

* cited by examiner

*Primary Examiner*—Qi Han
(74) *Attorney, Agent, or Firm*—Staas & Halsey LLP

(57) ABSTRACT

The words of the target vocabulary are composed of segments, which have one or more phonemes, whereby the segments are derived from a training text that is independent from the target vocabulary. The training text can be an arbitrary generic text.

21 Claims, 3 Drawing Sheets

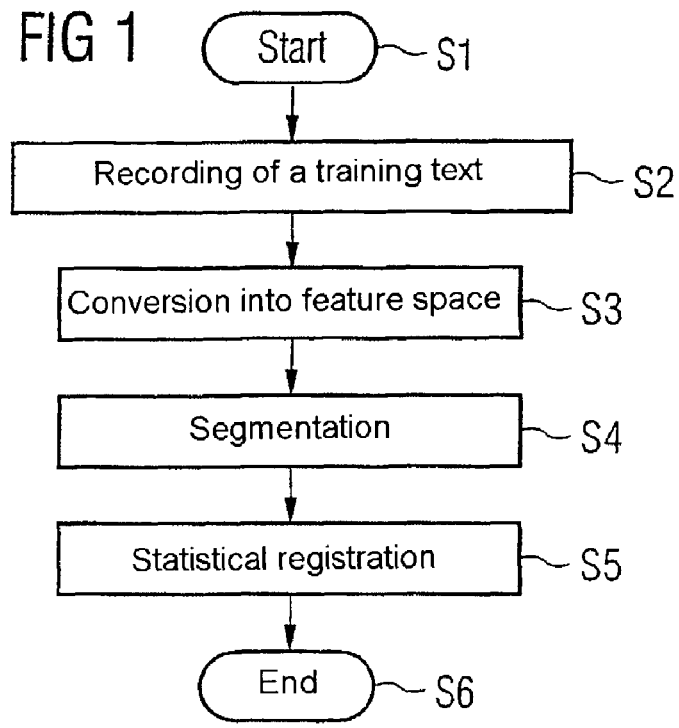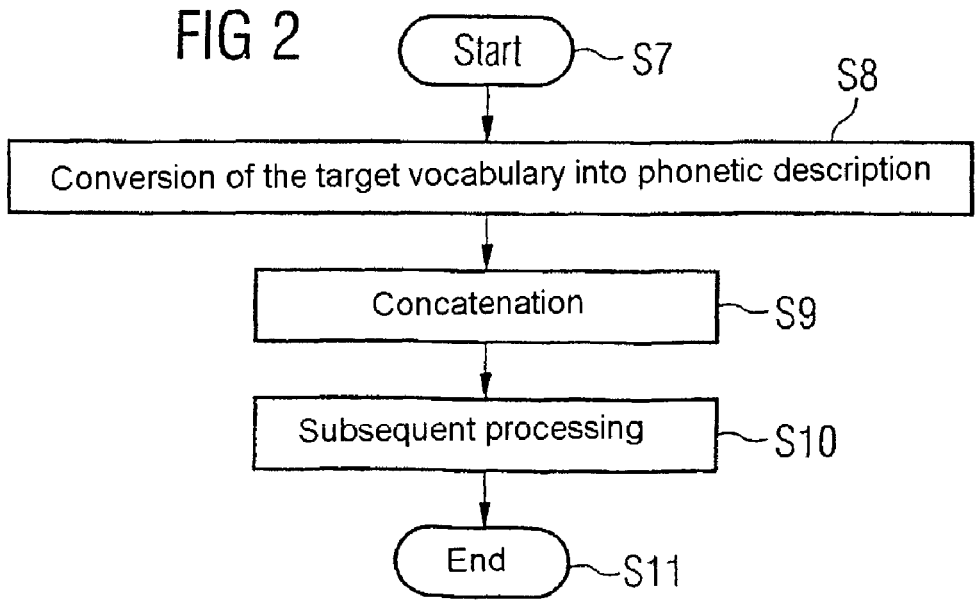

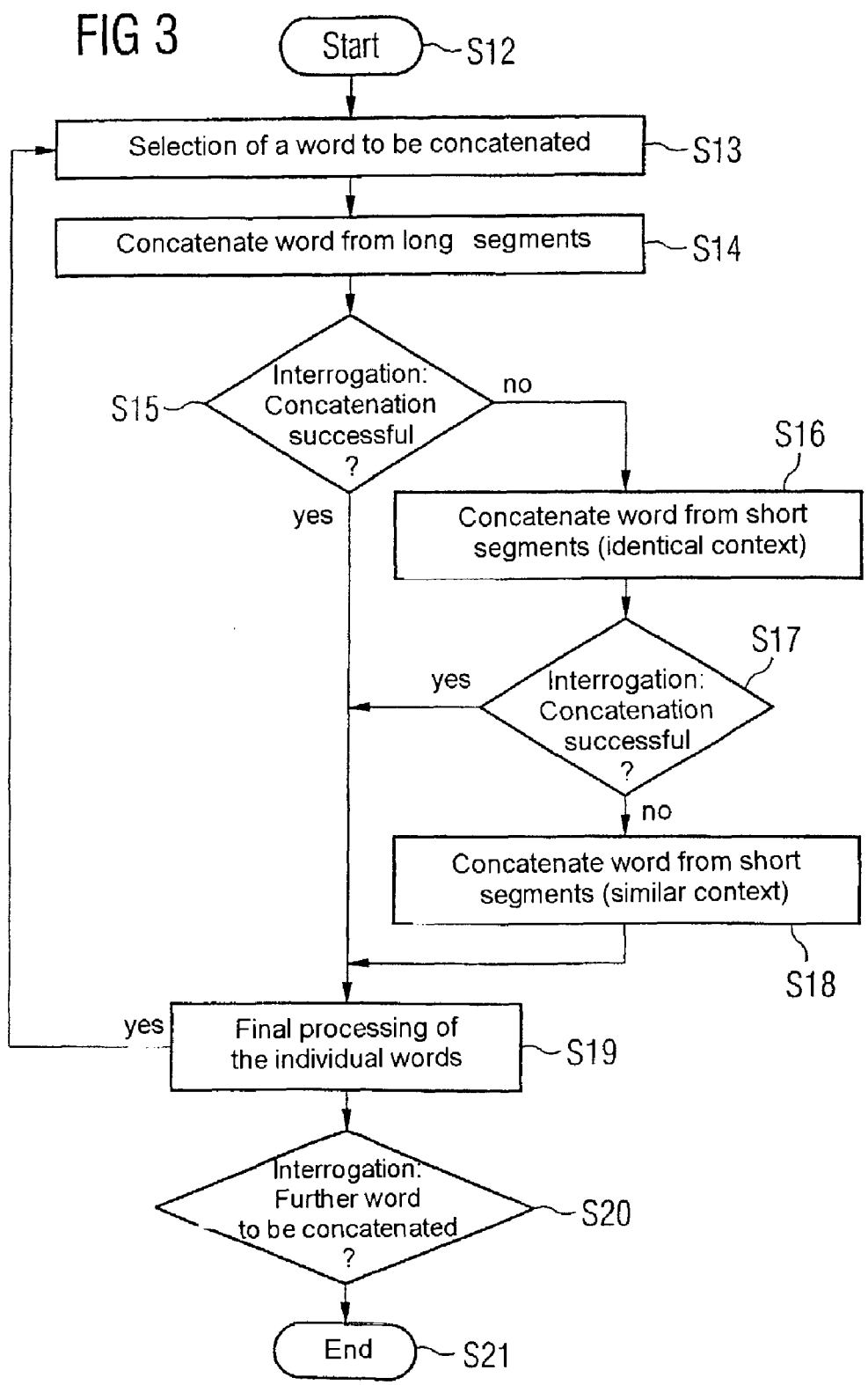

METHOD FOR CREATING A SPEECH DATABASE FOR A TARGET VOCABULARY IN ORDER TO TRAIN A SPEECH RECOGNITION SYSTEM

CROSS REFERENCE TO RELATED APPLICATIONS

This application is based on and hereby claims priority to PCT Application No. PCT/DE01/01546 filed on 24 Apr. 2001 and German Application No. 100 22 586.1 filed on 9 May 2000, the contents of which are hereby incorporated by reference.

BACKGROUND OF THE INVENTION

The invention relates to a method for creating a speech database for a target vocabulary for training a speech recognition system.

There are speech recognition systems for a wide variety of applications. For example, in automatic dictation systems, speech recognition systems are used which can recognize a very extensive vocabulary but are usually embodied in a user-specific fashion, that is to say they can be used only by a single user who has trained the speech recognition system to his personal pronunciation. On the other hand, automatic switching systems in telephone equipment use speech recognition systems. These speech recognition systems require a significantly smaller vocabulary as, in telephone switching systems, for example only a small number of different words are spoken in order to set up a connection to a telephone subscriber.

A target vocabulary (application vocabulary) has been conventionally defined for speech recognition systems which are independent of speakers. Training texts which predominantly contain words from this target vocabulary are then composed. These training texts are spoken by speakers and recorded by a microphone. Such a training text can usually be spoken by 100 to 5000 speakers. The spoken texts are thus present as electrical speech signals. The texts to be spoken are also converted into their phonetic description. This phonetic description and the corresponding speech signals are fed to the speech recognition system during the training phase of the speech recognition system. By this, the speech recognition system learns the target vocabulary. As the target vocabulary has been spoken by a large number of speakers, the speech recognition system is independent of a particular individual speaker.

The generation of a special application with a predetermined target vocabulary and speaking by a plurality of speakers so that a speech database which is independent of speakers is created generally takes between two to six months. The generation of such application-specific speech databases gives rise to the greatest cost factor where an existing speech recognition system is adapted to a specific application. There is therefore a considerable need for a method with which a speech database for training a speech recognition system which is independent of a speaker can be generated cost-effectively and quickly.

SUMMARY OF THE INVENTION

One aspect of the invention is therefore based on the object of producing a method for creating a speech database for a target vocabulary for training a speech recognition system with which the speech database can be created more quickly, and above all more cost-effectively.

According to the method for creating a speech database for a target vocabulary for training a speech recognition system, the words of the target vocabulary are converted into a phonetic description so that the individual words are represented by phonemes, and segments, composed of one or more phones, of a spoken training text which is independent of the target vocabulary are concatenated or combined to form words of the target vocabulary in accordance with the phonetic description.

With the method, segments of a training text which is independent of the target vocabulary are combined to form the words of the target vocabulary. The training text can thus be any desired text which has already been recorded in advance and segmented into individual speech segments. To create the speech database it is therefore not necessary to create and record each time a training text which contains the target vocabulary. It is instead possible to use existing speech databases with general vocabulary items. The words of these existing speech databases are segmented in advance. This segmentation can take place manually or automatically. Basically it is sufficient for a database which is segmented in such a way to be present merely a single time for each language. The method is used to create a speech database which is specific for an application on the basis of this database. It is thus not necessary to speak a training text again.

The method can be used to create quickly and cost-effectively a speech database which is suitable for training a speech recognition system which is independent of a speaker, it being unnecessary for specific training texts to be recorded, as a result of which the costs are reduced drastically in comparison with the known methods for generating such speech databases.

The words of the target vocabulary are preferably composed from segments which are as long as possible. If this is not possible, the individual phonemes of the words have to be assigned relatively short segments with in each case a single phone and concatenated to form the corresponding word. This is preferably carried out taking into account the context in which the respective phonemes of the words and the phones of the training text are arranged.

According to another preferred embodiment, concatenated segments are smoothed at their boundaries between two adjacent segments.

The segments can be present in the form of electrical speech signals or as feature vectors. The latter representation form is advantageous as the amount of data of the feature vectors is significantly smaller than that of the electrical speech signals.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 is a schematic view of a method for preparing a recorded training text for the method according to one aspect of the invention, FIG. 2 is a schematic general overview of the sequences in the method according to one aspect of the invention for creating a speech database in a flowchart, FIG. 3 is a schematic view of the method for concatenating the words of the target vocabulary from speech segments in a flowchart.

DETAILED DESCRIPTION OF THE PREFERRED EMBODIMENT

Figure 4:
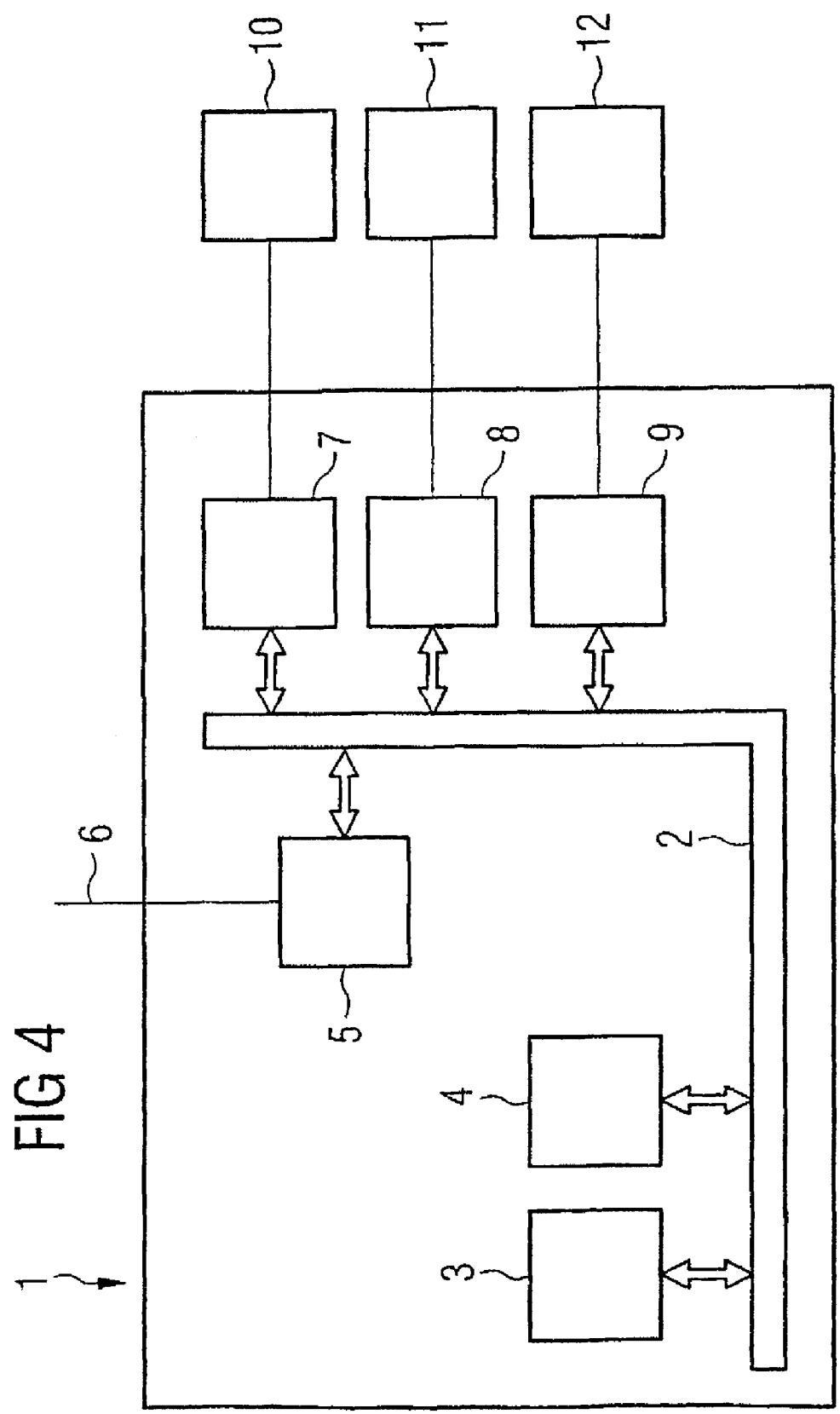
FIG. 4 is a schematic view of a computer system for executing the method according to one aspect of the invention in a block circuit diagram.

Reference will now be made in detail to the preferred embodiments of the present invention, examples of which are illustrated in the accompanying drawings, wherein like reference numerals refer to like elements throughout.

The method relates generally to the concatenation or combination of words of a target vocabulary from segments of a spoken text.

The target vocabulary is to be described phonetically, that is to say the individual words are represented by phonemes. The segments are composed of individual phones.

In the sense of the present description, a phoneme is the smallest meaning-distinguishing, but not in itself meaningful unit of speech (for example I in leg in contrast to p in peg). On the other hand, a phone is the spoken sound of a phoneme. Phonemes are represented in a phonetic script, each "letter" of the phonetic script representing a phoneme. Phones are represented by physical variables which represent the spoken sound in itself. These physical variables can be electrical speech signals which can be converted in a loudspeaker into corresponding acoustic signals which represent the sound. However phones can also be represented by what are referred to as feature vectors. Feature vectors comprise coefficients which represent the corresponding speech signal at a particular time. Such coefficients are obtained by sampling the speech signal at predetermined time intervals. Typical time intervals are 10 ms to 25 ms. Known coefficients are the ACF (Auto-Correlation Function) coefficients and the LPCC coefficients (Linear Predictive Cepstral Coefficient).

The explanations above can be summarized to the effect that phonemes are the symbolic description of individual sounds and phones are the physical description of the sounds.

A method for converting a training text into speech segments will be explained below with reference to FIG. 1, the speech segments comprising one or more phones.

The method starts in step S1. In step S2, one or more training texts are spoken and recorded electronically by a plurality of speakers.

In step S3, the electronically recorded training texts are converted into feature vectors for the sake of data reduction.

The speech recording stored in this way is divided into segments in step S4, the individual segments each comprising a single phone. This segmentation is generally carried out automatically. The speech recording can, however, be presegmented manually by a speech expert before the conversion into feature vectors.

These segments which each comprise a single phone are registered statistically in step S5, typical sounds and sound sequences being evaluated statistically and recorded. This statistical information about the sound sequences results, in conjunction with the segments which each contain only a single phone, in the segments with a plurality of phones which are contained in the training text being represented again. As a result, not only segments with a single phone but also relatively long segments with at least two phones are available for the further evaluation.

In step S5, preferably energy standardization of the individual segments is executed as the different speakers usually speak with a different volume level so that the individual segments of different speakers cannot be compared with one another and it is often also impossible to combine them to form a new word.

This method for preparing the segments is terminated in step S6.

With the method for preparing a training text shown in FIG. 1, a segment database is created. It is basically sufficient that only a single segment database is created for each language for which the method is to be applied. General texts which are already available in large numbers for the most important languages as a database in the form of, for example, an ASCII file for the texts and in the form of speech signals are used as training texts.

FIG. 2 shows the general sequence of the method for creating a speech database for a predefined target vocabulary in the form of a flowchart.

The target vocabulary is present as a text file (for example ASCII file). The target vocabulary comprises the words which are necessary for the intended application. Such target vocabularies may comprise, for example, only a few words (for example 20 to 50 words) which are necessary, for example, for actuating a specific device. However, it is also possible to provide even smaller target vocabularies with just a single word or even relatively large target vocabularies which comprise, for example, several thousand words.

The method for creating a speech database starts with step S7. In step S8, the words of the target vocabulary are converted into their phonetic description. For this purpose, rule-based methods are known which perform such a conversion automatically. It is basically also possible to use statistical methods. More recent methods for converting a text file into its phonetic notation are based on neural networks.

In the following step S9, the segments of the training text are concatenated to form the individual words of the target vocabulary. Here, segments whose phones correspond to the phonemes of the words of the target vocabulary are combined or concatenated to form the corresponding words.

If all the words of the target vocabulary are concatenated, it is possible to carry out reprocessing in step S10. Here, for example, a data reduction is carried out if the concatenated words are present as a speech signal.

The method is terminated in step S11.

The individual method steps which are to be carried out during the concatenation are represented in FIG. 3.

This concatenation process starts with step S12. Firstly, a word of the target vocabulary which is to be concatenated is selected in step S13.

In step S14, attempts are made to compose the selected word by a single segment or by a few long segments. Here, segments whose phoneme assignment corresponds to the phonemes of the word to be concatenated are selected from the segment database.

In step S15 there is an interrogation to determine whether the word could be concatenated successfully from the long segments. If the result of this interrogation is no, this means that there are no suitable long segments present in the segment database from which the word can be composed. The method sequence therefore goes to step S16 in which the word is concatenated from individual phonemes taking into account the corresponding context. Here, segments with a single phone are assigned to the corresponding phonemes of the word to be concatenated, but only phones are used whose adjacent phones in the training text correspond to the phonemes which are adjacent to the respective phoneme in the word to be concatenated. If, for example, the phone "f" is assigned to the phoneme "f" in the word "unfit", a segment with the phone "f" which is arranged between the phones "n"

and "i" in the training text is selected from the training text. The context "nfi" of the segment "f" thus corresponds to the context of the phoneme "f" of the word from the target vocabulary.

In step S17 it is checked whether the word to be concatenated could be completely concatenated. If this check results in a "no", the method sequence goes to step S18. In step S18, segments whose phone corresponds as far as possible to the corresponding phoneme and whose context is as similar as possible are selected for those phonemes to which it has not yet been possible to assign segments. If no segments are present with phones which directly correspond to the phonemes, those segments are selected whose phones are as similar as possible to the phonemes.

The similarity of the contexts or of the phones to the individual phonemes is evaluated according to predetermined rules. These rules can be stored, for example, as lists in a special similarity database, a list of further phonemes being stored for each phoneme, and the further phonemes being sorted with decreasing similarity. For example, for the phoneme "p" the following list with "b, d, t, . . ." is stored. This means that the phoneme "b" is most similar to the phoneme "p" and the phoneme "d" is the second most similar phoneme. The similarity database can also comprise contexts with two or more phonemes. For the context "_a_s", for example the list "_a_f, _a_x, . . ." is stored. This means that the context "_a_f" is most similar to "_a_s". The sequence of the stored similar phonemes can differ depending on the definition of the criterion of "similarity". The notation "_a_s" used above is a company-internal notation and means:

_a_s: phoneme a with s context to the right
_a_x: phoneme a with x context to the right
t_a_: phoneme a with t context to the left
p_a_: phoneme a with p context to the left etc.

Instead of such lists or as a supplement to these lists it is also possible to provide general rules for comparing similar contexts. Thus, plosives or frictives can basically be evaluated as very similar in one context.

After the assignment of the most similar segments to the corresponding phonemes of the word to be concatenated, the method sequence goes to step S19. If it becomes apparent in the interrogating steps S15 and S17 that the concatenation has been executed successfully, the method sequence also goes directly to step S19 here.

The final processing of the individual concatenated words takes place in step S19. This final processing can comprise the following partial steps individually or in combination:

A noise sequence which is typical of the start and of the end of the word is added to the start and the end of a word which has just been concatenated.

The individual segments in the words are standardized. This is particularly expedient if a segment database with non-standardized segments is used.

The transitions at the boundaries between two adjacent segments are smoothed, the first and second derivation of the speech signal or of the coefficients of the feature vectors at the junction point being as far as possible 0.

In step S20 there is checking to determine whether there is still a further word of the target vocabulary to be concatenated. If the interrogation results in a yes, the process sequence goes to step S13, whereas the method is terminated in step S21 if the interrogation results in a no.

The words of the target vocabulary which are concatenated with the method represent a speech database with which a speech recognition system can be trained to the target vocabulary. To generate this speech database it is not necessary to generate specific training texts which contain the target vocabulary and have to be spoken and recorded by speakers. Instead, the method can be used to evaluate a general training text which has been spoken once by one or more speakers and correspondingly segmented, in order to create a speech database for a specific target vocabulary. This means a considerable gain in time and an enormous saving in costs in the creation of a speech database for a specific target vocabulary. This means a considerable saving in time and an enormous saving in cost when creating a speech database for a specific target vocabulary.

A target vocabulary with ten words has been concatenated with a very simplified prototype of the method, only segments with one or two phones having been taken into account. With this prototype, standardization was not performed and there was no smoothing of the junctions between adjacent segments. In addition, the segment database was based on a training text with only 60 different words.

Despite this very small quantity of data and the highly simplified method a detection rate of approximately 80% has been achieved.

The invention has been explained above in more detail with reference to an exemplary embodiment. However, it is not restricted to the specific exemplary embodiment. For example, it is possible within the scope of the invention to select a plurality of similar segments from the segment database for each phoneme of a word to be concatenated and then to evaluate these similar segments on the basis of their similarity to the phoneme or to the context which can have two, three, four or more phonemes. The most similar segment is selected. It is also possible, however, to select a group of similar segments and, instead of determining an individual segment which is assigned to the phoneme, to calculate, from this group of segments, an average segment which is assigned to the phoneme. This is expedient in particular if the phones of the segments are described by feature vectors which can be averaged. Instead of averaging of the plurality of segments it is also possible to determine a segment whose distance (vector distance of the feature vectors) from the selected segments is the smallest.

The method can be implemented as a computer program which can run independently on a computer in order to create a speech database from a segment database. It thus constitutes a method which can be executed automatically.

The computer program can be stored on electrically readable data carriers and thus transmitted to other computer systems.

A computer system which is suitable for application of the method is shown in FIG. 4. The computer system 1 has an internal bus 2 which is connected to a memory area 3, a central processor unit 4 and an interface 5. The interface 5 sets up a data connection to further computer systems via a data line 6. In addition, an acoustic input unit 7, a graphic output unit 8 and an input unit 9 are connected to the internal bus 2. The acoustic input unit 7 is connected to a loudspeaker 10, the graphic output unit 8 is connected to a screen 11, and the input unit 9 is connected to a keyboard 12. A target vocabulary, which is stored in the memory area 3, can be transmitted to the computer system 1, via, for example, the data line 6 and the interface 5. The memory area 3 is divided into a plurality of areas in which the target vocabulary, the program for executing the method and further application and help programs are stored. A speech database for the target vocabulary is generated with the method. This speech database is then used for training a speech recognition system. The speech recognition system can automatically convert incoming audio files into text files. The audio files can be created by speaking a test into the microphone 10.

The invention has been described in detail with particular reference to preferred embodiments thereof and examples, but it will be understood that variations and modifications can be effected within the spirit and scope of the invention.

The invention claimed is:

1. A method for creating a speech database for training of a speech recognition system with a target vocabulary, comprising:

converting the words of the target vocabulary into a phonetic description so that the individual words are represented by a sequence of phonemes; and concatenating, using a computer, segments of a generic spoken training text to form the words of the target vocabulary and thereby the speech database, each segment containing at least one phone, the segments being concatenated to form a sequence of phones which correspond respectively to the sequence of phonemes of the target vocabulary.

2. The method as claimed in claim 1, wherein the segments of the generic spoken training text are selected for concatenation such that segments having more phones are selected over segments having less phones and the selected segments are as long as possible.

3. The method as claimed in claim 2, wherein for at least segments having only one phone, context information, relating to phones of adjacent segments phones is stored, and if it is not possible to form a word of the target vocabulary by concatenating only segments with at least two phones, a segment having only one phone is selected if:

the phone of the segment corresponds to phoneme in the word of the target vocabulary, and the context information for the segment indicates that adjacent phones correspond to phonemes adjacent to the phoneme in the word of the target vocabulary.

4. The method as claimed in claim 3 wherein if no segment of the generic spoken training text has two adjacent phones corresponding to two phonemes adjacent to the phoneme in the word of the target vocabulary, a segment is selected if:

the phone of the segment corresponds to the phoneme in the word of the target vocabulary, and the context information for the segment indicates that one of the two adjacent phones corresponds to the respective adjacent phoneme in the word of the target vocabulary.

5. The method as claimed in claim 4, wherein the segments to be concatenated are smoothed at the boundaries between two adjacent segments.

6. The method as claimed in claim 5, wherein the individual segments are energy-standardized before the concatenation.

7. The method as claimed in claim 6, wherein the segments are in the form of electrical speech signals.

8. The method as claimed in claim 6, wherein the segments are represented by feature vectors.

9. The method as claimed in claim 8, wherein if a plurality of potential segments are available for concatenation, a calculated segment is selected for concatenation, the calculated segment being produced by averaging feature vectors associated with each of the potential segments.

10. The method as claimed in claim 9, wherein the phones of the generic spoken training text are saved in a format which reduces data.

11. The method as claimed in claim 8, wherein if a plurality of potential segments are available for concatenation, a calculated segment is selected for concatenation, the calculated segment being produced by obtaining a segment whose feature vector has the smallest average distance from feature vectors of the potential segments.

12. The method as claimed in claim 11, wherein the phones of the generic spoken training text are saved in a format which reduces data.

13. The method as claimed in claim 1, wherein the segments to be concatenated are smoothed at the boundaries between two adjacent segments.

14. The method as claimed in claim 1, wherein the individual segments are energy-standardized before the concatenation.

15. The method as claimed in claim 1, wherein the segments are in the form of electrical speech signals.

16. The method as claimed in claim 1, wherein the segments are represented by feature vectors.

17. The method as claimed in claim 16, wherein if a plurality of potential segments are available for concatenation, a calculated segment is selected for concatenation, the calculated segment being produced by averaging feature vectors associated with each of the potential segments.

18. The method as claimed in claim 16, wherein if a plurality of potential segments are available for concatenation, a calculated segment is selected for concatenation, the calculated segment being produced by obtaining a segment whose feature vector has the smallest average distance from feature vectors of the potential segments.

19. The method as claimed in claim 1, wherein the phones of the generic spoken training text are saved in a format which reduces data.

20. A computer readable medium storing a program to control a computer to perform a method for creating a speech database for training of a speech recognition system with a target vocabulary, said method comprising:

converting the words of the target vocabulary into a phonetic description so that the individual words are represented by a sequence of phonemes, and concatenating segments of a generic spoken training text to form the words of the target vocabulary and thereby the speech database, each segment containing at least one phone, the segments being concatenated to form a sequence of phones which correspond respectively to the sequence of phonemes of the target vocabulary.

21. A method for creating a speech database for training of a speech recognition system with a target vocabulary, comprising:

converting the words of the target vocabulary into a phonetic description so that the individual words are represented by a sequence of phonemes;

obtaining a generic spoken training text produced from speech of at least 100 speakers; and concatenating, using a computer, segments of the generic spoken training text to form the words of the target vocabulary and thereby the speech database, each segment containing at least one phone, the segments being concatenated to form a sequence of phones which correspond respectively to the sequence of phonemes of the target vocabulary, wherein the speech database is created without requiring speakers to speak the entire target vocabulary.

* * * * *